United States Patent
Callsen et al.

(10) Patent No.: US 9,120,118 B2
(45) Date of Patent: *Sep. 1, 2015

(54) SUPPORT STRUCTURES AND METHODS

(71) Applicants: Kevin F Callsen, Cleveland, OH (US);
David H Trachtman, Fullerton, CA (US)

(72) Inventors: Kevin F Callsen, Cleveland, OH (US);
David H Trachtman, Fullerton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/162,782

(22) Filed: Jan. 24, 2014

(65) Prior Publication Data

US 2014/0134396 A1 May 15, 2014

Related U.S. Application Data

(63) Continuation of application No. 11/846,878, filed on Aug. 29, 2007, now Pat. No. 8,668,977.

(60) Provisional application No. 60/862,477, filed on Oct. 23, 2006.

(51) Int. Cl.
*B32B 3/12* (2006.01)
*B32B 3/26* (2006.01)
(Continued)

(52) U.S. Cl.
CPC .............. *B05D 3/00* (2013.01); *A47C 27/085* (2013.01); *A47C 27/142* (2013.01);
(Continued)

(58) Field of Classification Search
CPC ............ B32B 3/00; B32B 3/26; B32B 3/263; B32B 3/266; B32B 3/28; B32B 3/30; B32B 5/00; B32B 5/18; B32B 5/22; A47C 27/085; A47C 27/144; A47C 27/15; A47C 27/142; A47C 27/20; A47C 27/146
USPC .............. 428/156, 158, 159, 160, 172, 304.4, 428/318.4, 318.6; 5/644, 654, 655.5, 655.9, 5/740, 909
See application file for complete search history.

(56) References Cited

U.S. PATENT DOCUMENTS

| 2,604,642 | A | 7/1952 | Marco |
| 3,308,491 | A | 3/1967 | Spence |

(Continued)

FOREIGN PATENT DOCUMENTS

WO 2008051890 A2 5/2008

OTHER PUBLICATIONS

Written Opinion of the International Searching Authority from International Application No. PCT/US2007/082053 internationally filed on Oct. 22, 2007 and published as WO2008/051890 A2 on May 2, 2008.

*Primary Examiner* — Catherine A Simone
(74) *Attorney, Agent, or Firm* — Pearne & Gordon LLP (57) ABSTRACT

A support structure includes a first layer of foam material and a second layer of elastomeric gel material. In accordance with one example, the first layer of foam material includes a first side with a plurality of protrusions and a plurality of channels with the second layer of elastomeric gel material disposed within the plurality of channels. In accordance with another example, the first layer of foam material includes a first side with a plurality of protrusions and a network of channels surrounding at least one of the plurality of protrusions with the second layer of elastomeric gel material disposed within the network of channels. A third layer extends over the first support surface of the protrusions and the second support surface of the second layer of gel material. In accordance with yet another example, the first layer of foam material includes a first side with a plurality of protrusions extending through corresponding Shapertures of the second layer. In accordance with further examples, methods of making a support structure with a first layer of foam material and a second layer of elastomeric gel material are provided.

26 Claims, 7 Drawing Sheets

(51) Int. Cl.
*B05D 3/00* (2006.01)
*A47C 27/08* (2006.01)
*A47C 27/14* (2006.01)
*A47C 27/15* (2006.01)
*A47C 27/20* (2006.01)
*B32B 5/18* (2006.01)

(52) U.S. Cl.
CPC ............ *A47C 27/144* (2013.01); *A47C 27/146* (2013.01); *A47C 27/15* (2013.01); *A47C 27/20* (2013.01); *B32B 5/18* (2013.01); *Y10T 428/24339* (2015.01); *Y10T 428/24355* (2015.01); *Y10T 428/24496* (2015.01); *Y10T 428/24504* (2015.01); *Y10T 428/24512* (2015.01); *Y10T 428/24612* (2015.01)

(56) References Cited

U.S. PATENT DOCUMENTS

| | | |
|---|---|---|
| 3,468,311 A | 9/1969 | Gallagher |
| 4,179,826 A | 12/1979 | Davidson |
| 4,808,469 A | 2/1989 | Hiles |
| 5,172,494 A | 12/1992 | Davidson |
| 5,336,708 A | 8/1994 | Chen |
| 5,444,881 A | 8/1995 | Landi et al. |
| 5,633,286 A | 5/1997 | Chen |
| 5,636,395 A | 6/1997 | Serda |
| 5,749,111 A | 5/1998 | Pearce |
| 5,836,027 A | 11/1998 | Leventhal et al. |
| 6,009,578 A | 1/2000 | Davis |
| 6,026,527 A | 2/2000 | Pearce |
| 6,212,719 B1 | 4/2001 | Thomas et al. |
| 6,413,458 B1 | 7/2002 | Pearce |
| 6,598,251 B2 | 7/2003 | Habboub et al. |
| 6,625,830 B2 | 9/2003 | Lampel |
| 6,687,933 B2 | 2/2004 | Habboub et al. |
| 6,739,008 B1 | 5/2004 | Kindrick |
| 6,842,926 B2 | 1/2005 | Kuo |
| 7,060,213 B2 | 6/2006 | Pearce |
| 7,076,822 B2 | 7/2006 | Pearce |
| 2003/0041379 A1 | 3/2003 | Habboub et al. |
| 2004/0098806 A1 | 5/2004 | Stender et al. |
| 2004/0200003 A1 | 10/2004 | Kuo |
| 2004/0226099 A1 | 11/2004 | Pearce |
| 2004/0229986 A1 | 11/2004 | Pearce |
| 2005/0017396 A1 | 1/2005 | Pearce et al. |
| 2006/0253988 A1 | 11/2006 | Pearce |
| 2007/0088392 A1 | 4/2007 | Skiba et al. |
| 2007/0226911 A1 | 10/2007 | Gladney et al. |
| 2010/0005595 A1 | 1/2010 | Gladney et al. |

SUPPORT STRUCTURES AND METHODS

CROSS-REFERENCE TO RELATED APPLICATIONS

This application is a continuation of prior U.S. application Ser. No. 11/846,878, filed Aug. 29, 2007, which claims the benefit of U.S. Provisional Application No. 60/862,477, filed Oct. 23, 2006, the entire disclosure disclosures of which are hereby incorporated herein by reference.

FIELD OF THE INVENTION

The present invention relates generally to support structures and methods, and more particularly, to support structures and methods including a first layer of foam material and a second layer of elastomeric gel material.

BACKGROUND OF THE INVENTION

Conventional support structures are frequently used to enhance comfort of body portions being supported against the force of gravity. For example, it is known to provide conventional support structures with a foam material configured to support body portions. It is also known to provide a composite support structure with different density materials. However, known support structures may not provide a desired support characteristic, may be excessive in weight, and/or may be relatively expensive to produce.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a support structure is provided with a first layer of foam material and a second layer of elastomeric gel material. The first layer of foam material includes a first side with a plurality of protrusions and a plurality of channels. The protrusions each include a first support surface substantially facing a first direction. The second layer of elastomeric gel material is disposed within the plurality of channels and includes a second support surface substantially facing the first direction and disposed laterally with respect to each first support surface.

In accordance with another aspect of the present invention, a support structure comprises a first layer of foam material and a second layer of elastomeric gel material. The first layer of foam material includes a first side with a plurality of protrusions and a network of channels surrounding at least one of the plurality of protrusions. The protrusions each include a first support surface substantially facing a first direction. The second layer of elastomeric gel material is disposed within the network of channels and includes a second support surface substantially facing the first direction and surrounding at least one of the plurality of protrusions. The protrusions extend at least partially through the second layer with the second support surface disposed laterally with respect to each first support surface. A third layer extends over the first support surface of the protrusions and the second support surface of the second layer of gel material. The third layer includes a support surface substantially facing the first direction.

In accordance with still another aspect of the present invention, a support structure is provided with a first layer of foam material and a second layer of elastomeric gel material. The first layer of foam material includes a first side with a plurality of protrusions that each include a first support surface substantially facing a first direction. The second layer of elastomeric gel material includes a second support surface substantially facing the first direction and disposed laterally with respect to each first support surface. The second layer includes a plurality of through apertures, wherein the second layer is bonded to the first side of the first layer with the plurality of protrusions each extending at least substantially through a corresponding aperture of the plurality of apertures.

In accordance with yet another aspect of the present invention, a method of making a support structure is provided. The method includes the step of providing a first layer of foam material including a first side with a plurality of protrusions and a plurality of channels, wherein the protrusions each include a first support surface. The method further includes the step of dispensing a liquid material into the plurality of channels to a liquid level. The method still further includes the step of curing the dispensed liquid into a second layer of an elastomeric gel material such that a second support surface is formed at the liquid level.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Figure 1:
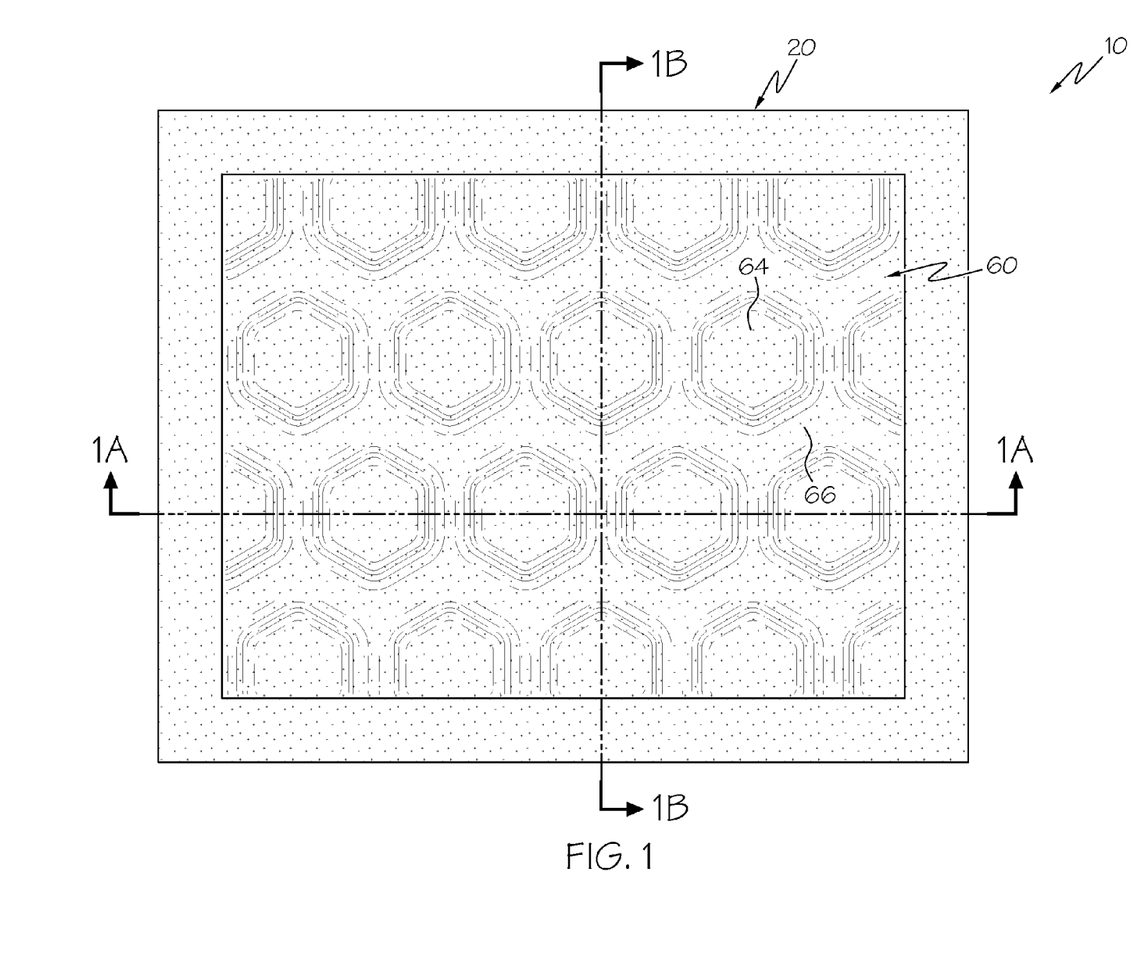
FIG. 1 a top view of an example support structure including aspects of the present invention.
Figure 1A:
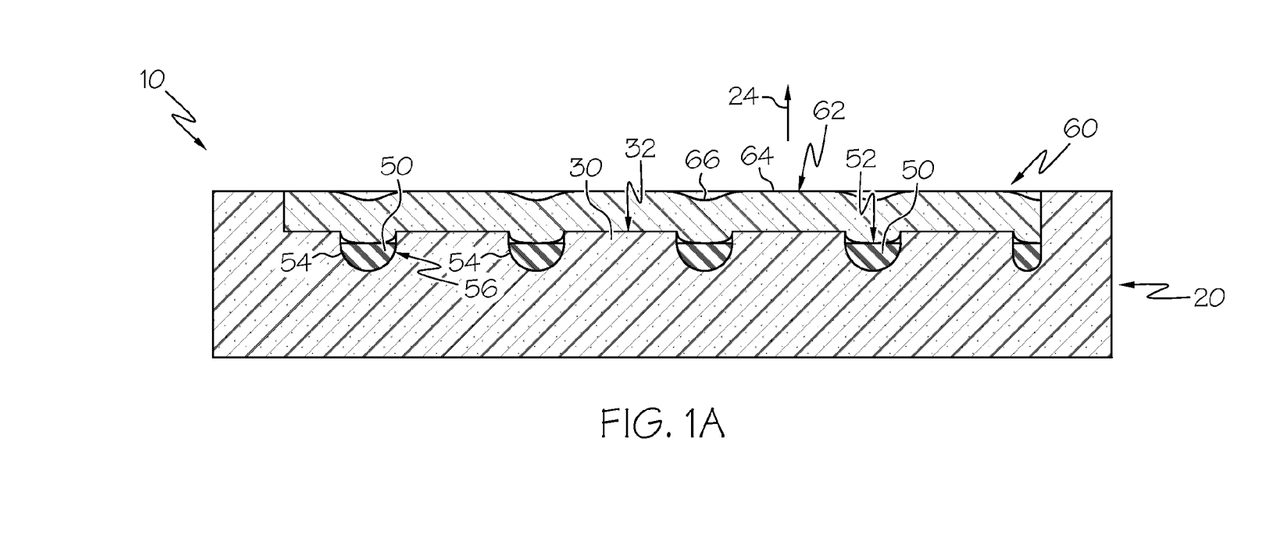
FIG. 1A is a sectional view of the support structure along line 1A-1A of FIG. 1, illustrating portions of a first layer of foam material, a second layer of elastomeric gel material, and a third layer extending over portions of the first layer and the second layer.
Figure 1B:
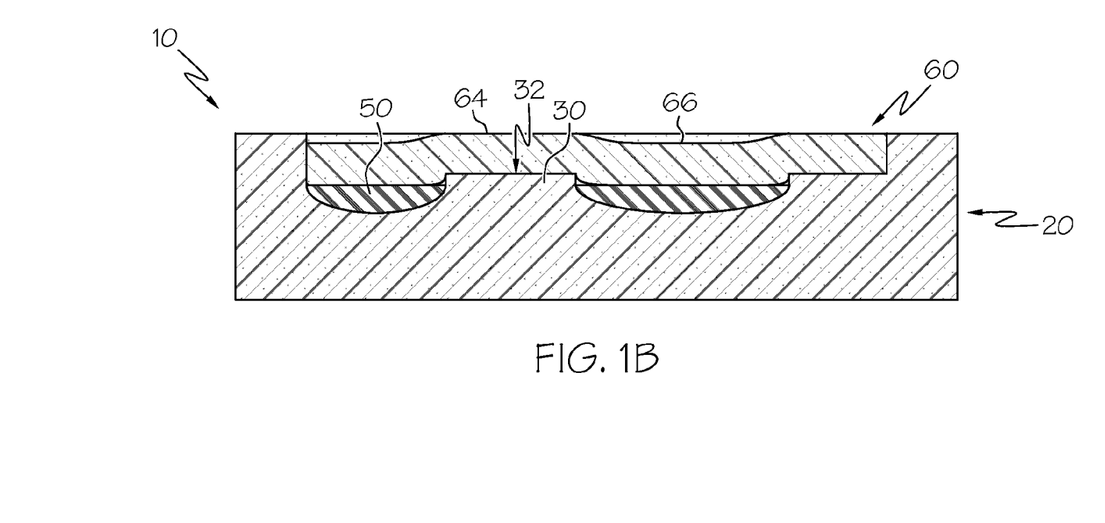
FIG. 1B is a sectional view of the support structure along line 1B-1B of FIG. 1, illustrating further portions of the first, second and third layers.

FIGS. 1, 1A and 1B illustrate an example support structure 10 incorporating aspects of the present invention. Example support structures incorporating aspects of the present invention may be used independently in a wide range of applications. For instance, support structures may be used as a stand-alone element for creature comfort or other support applications. Support structures incorporating aspects of the present invention can also be used in combination with other elements for creature comfort or other support applications.

Example support structures may be provided as a support pad for the hands, arms, legs, head, and/or other areas of an individual to provide a comfortable support surface for an area of the individual's body. In still further examples, support structures may be provided as a seat cushion to provide an individual with a comfortable seating surface. In yet additional examples, the support structures may be provided as a large support pad that can be used as a sleeping surface to support areas of the individual's body for a comfortable resting surface.

Example support structures can also be placed inside of another configuration to provide an overall comfortable support surface. For instance, a cushion may incorporate the support structure to allow the cushion to more effectively support an area of the individual's body. Still further, the support structures may be placed inside a mattress pad for placing over a mattress. In addition, or alternatively, the support structures may comprise a mattress insert placed within a portion of a mattress to provide a comfortable sleeping area for an individual.

Support structures can also be incorporated into sleeping or resting areas for animals such as dogs, cats or other pets. For instance, support structures may be provided for animals around the home, in a cage, car, or other area.

As shown in FIGS. 1, 1A, 1B, 2, 2A and 2B, the support structure 10 includes a first layer 20 of foam material and a second layer 50 of elastomeric gel material. The first layer 20 of foam material can include a first side 22 and a second side 26. As shown in the illustrated example, the first and second sides 22, 26 of the first layer 20 of foam material can be oriented to face substantially opposite directions. For instance, as shown, the first side 22 can face a first direction 24 and the second side 26 can face a second direction 28 opposite the first direction 24. It is to be appreciated that the first and second sides may face in other directions with respect to one another in further examples.

Figure 2:
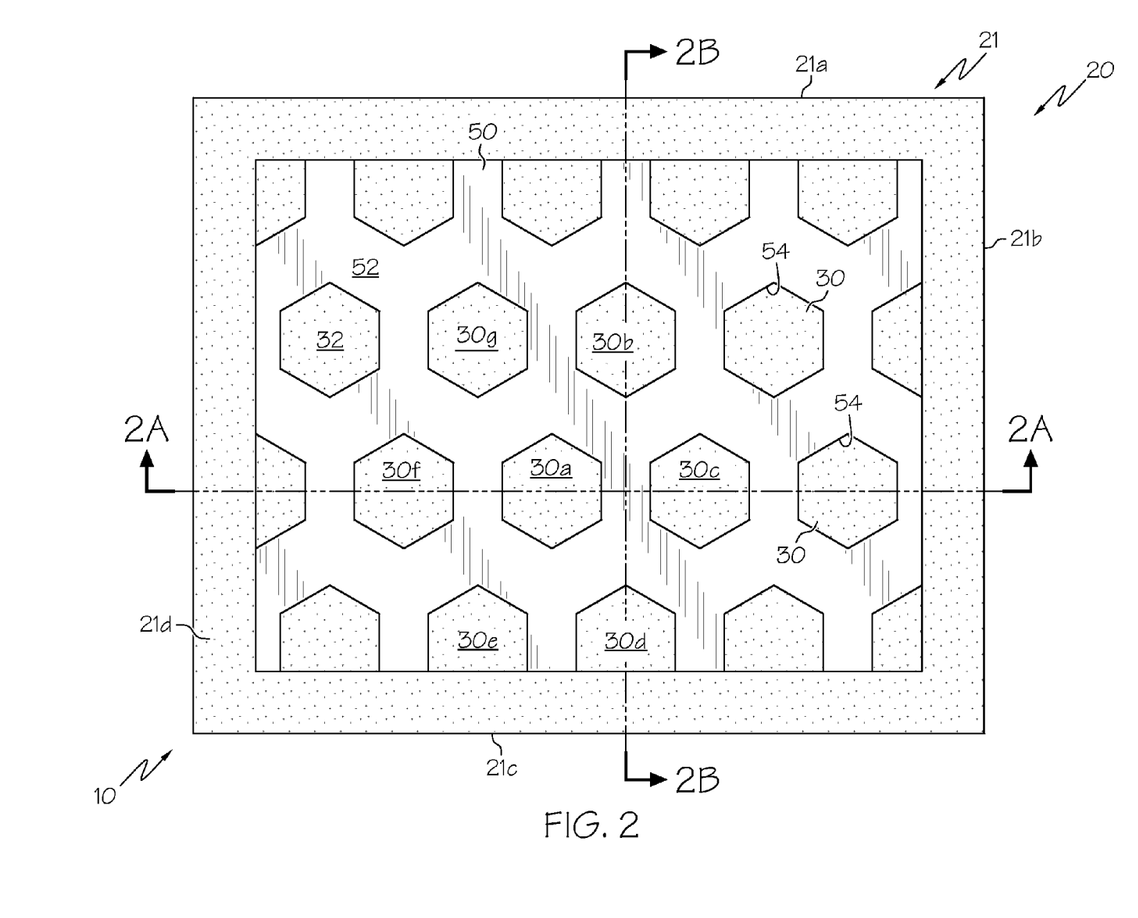
FIG. 2 is a top view of the example support structure of FIG. 1 without the third layer.
Figure 3:
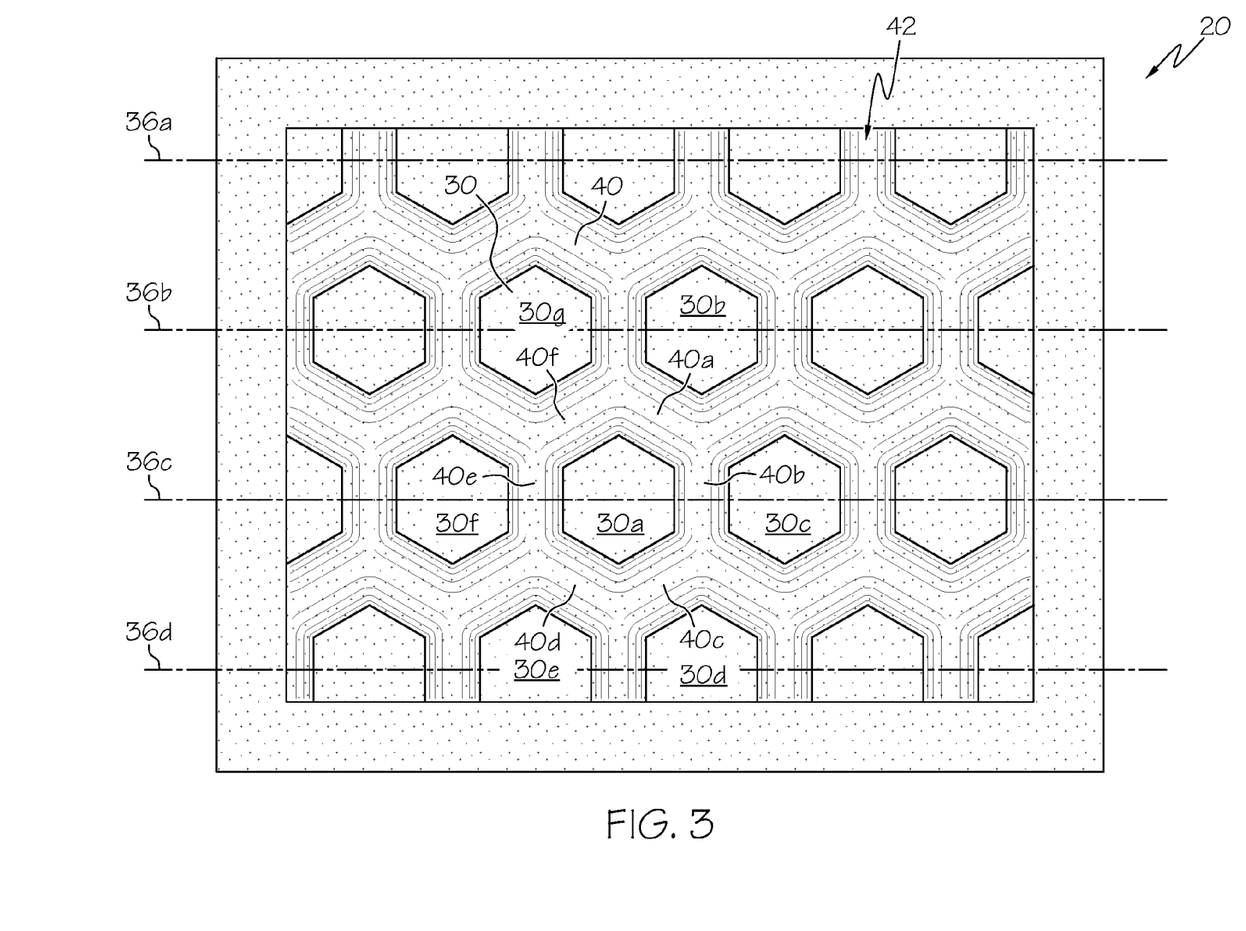
FIG. 3 is a top view of the example support structure of FIG. 1 without the first and second layers.
Figure 4:
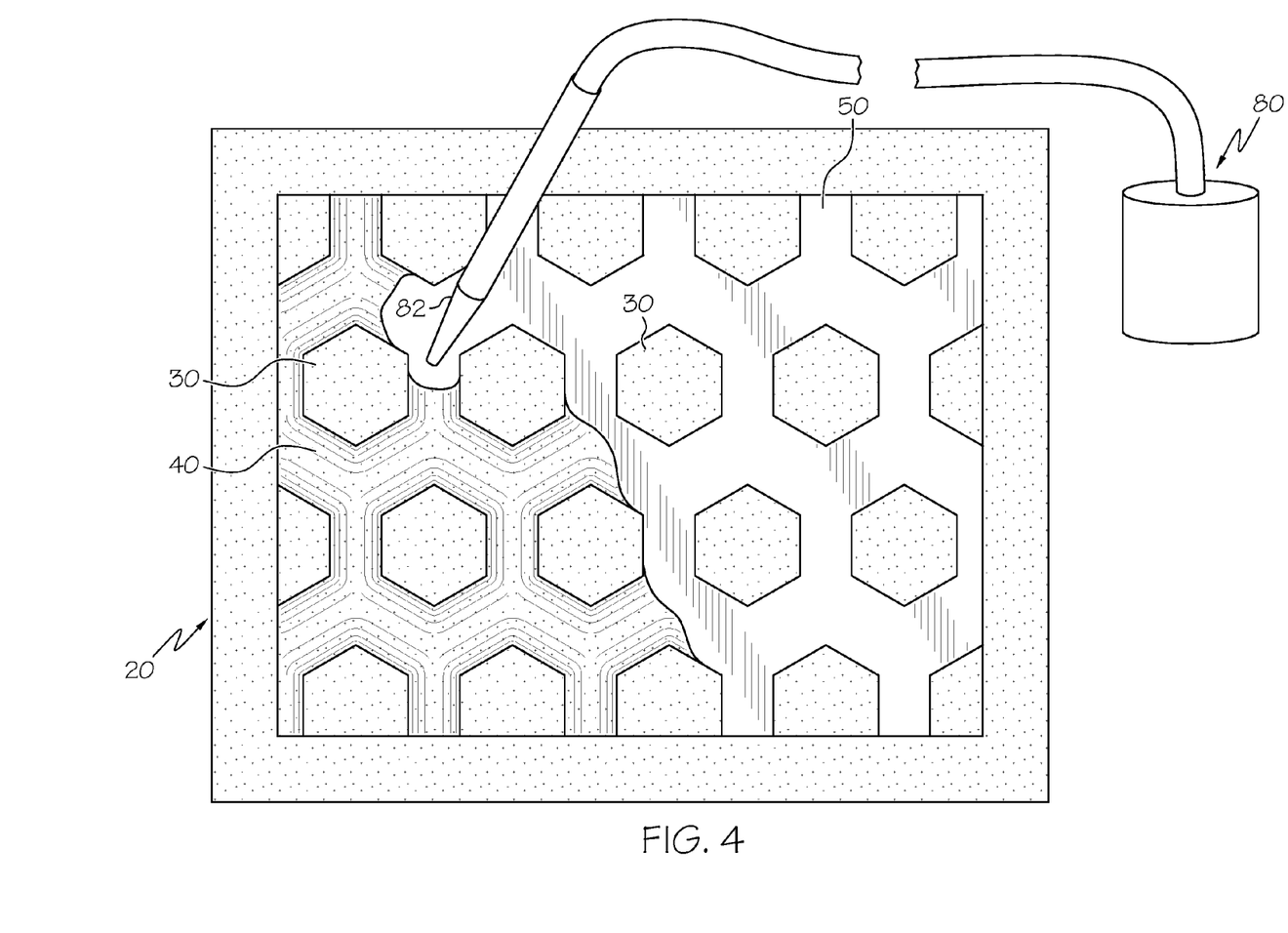
FIG. 4 illustrates an example method of making a support structure including the step of dispensing liquid into a plurality of channels of a first layer of foam material.

The first side 22 of the first layer 20 of foam material can include a plurality of protrusions 30 and a plurality of channels 40. The protrusions 30 can include a first support surface 32 that may face in a variety of directions. For instance, as shown, the first support surface 32 can be designed to substantially face the first direction 24. In the illustrated example, the protrusions 30 can comprise columns that can be spaced from one another and formed with a wide range of shapes and sizes. Example columns may be provided with a substantial polygonal shape. For instance, the columns may include a triangular, rectangular (e.g., square), or other polygon with three or more sides. For example, as shown in FIGS. 2-4, the protrusions 30 are formed as columns with six sides in the shape of a hexagon. Although all sides of the six-sided columns are illustrated as substantially flat surfaces with a straight profile when viewed from the top, it is contemplated that one or more sides may comprise curved surfaces, a plurality of straight profile segments and/or other shapes or configurations with one or more alternative profiles.

Although the protrusions 30 are illustrated as columns that are substantially polygonal in shape, it is contemplated that the columns may include other shapes. For example, although not shown, it is contemplated that the columns can include a circular, oval, D-shape or other shapes.

The plurality of channels 40 can be provided in a wide variety of configurations. As shown in FIG. 3, the plurality of channels 40 can comprise a network 42 of channels surrounding at least one of the plurality of protrusions 30. For instance, as shown, the plurality of channels 40 comprises a network 42 of channels that surrounds a plurality of inner protrusions 30 and segregates adjacent protrusions from one another. As shown in FIG. 3, several of the columns have been labeled to illustrate a central column 30a and adjacent columns 30b-g. As shown, the central column 30a can be surrounded by six adjacent columns 30b-g and the network 42 of channels can include six channels 40a-f. Each of the six channels can be respectively spaced between the central column 30a and a respective one of the adjacent columns 30b-g.

The channels may be substantially different shapes and sizes and can be configured to provide a reservoir area for the second layer 50 of elastomeric gel material. The channels can be designed to all be in communication with one another. For example, as shown, the network 42 of channels includes a plurality of channels that are all in communication with one another. In further examples, at least some of the channels may be isolated from one another. For instance, a first set of channels may be provided in communication with one another and one or more channels may be provided that are not in communication with the first set of channels. In further examples, the channels may comprise single isolated channels that are parallel or offset from one another. For instance, the channels may comprise a series of isolated substantially straight channels that are offset from one another. In further examples, the series of isolated channels my comprise curved channels (e.g., having a sinusoidal shape) or other shape that are offset from one another. In further examples, the channels may be cut or otherwise formed in foam in a wide variety of patterns.

The channels 40 can also comprise a wide variety of shapes and sizes. For instance, the channels have different or identical depths and widths. Moreover, the cross-sectional profile of the channels can vary in accordance with aspects of the present invention. For example, referencing FIGS. 2A and 2B the channels have a substantially U-shape with an arcuate lower surface. In further examples, the channels can have a substantially U-shape with a substantially flat lower surface although other shapes may be used in further examples.

As shown in the illustrated example, the plurality of protrusions 30 can be arranged in an array of protrusions. In one example, the array of protrusions can comprise a matrix of protrusions with alternate rows of protrusions that are sequentially laterally aligned with one another. With such an arrangement, each row of protrusions are vertically aligned with one another to form vertically aligned columns of protrusions wherein each column includes a protrusion from each row. In some examples, the vertical spacing between adjacent protrusions can be substantially identical to the horizontal spacing between adjacent protrusions. Such a matrix of protrusions may be beneficial for use with protrusions comprising a square shaped column although other shapes may be used in further examples. Using the square shaped columns with the matrix of protrusions can provide square shaped columns that are spaced from one another such that each of the four sides face another side of another adjacent square shaped column.

As shown in FIG. 3, the array of protrusions can also comprise alternate rows 36a, 36b of protrusions that are sequentially laterally offset from one another. In one example, such an arrangement can provide every other row of protrusions being vertically aligned with one another. For instance, as shown in FIG. 3, rows 36a and 36c include alternate rows of protrusions that are vertically aligned while rows 36b and 36d similarly include alternate rows of protrusions that are vertically aligned. As shown in FIG. 3, such an array of protrusions may be beneficial, for example, with protrusions comprising columns with a hexagonal shape although other shapes may be used in further examples. As shown, the array of hexagonal columns can be spaced from one another such that each of the six sides faces a side of another hexagonal column. As shown in FIG. 2, the central column 30a is surrounded by six adjacent columns 30b-g that are spaced from the central column 30a. In one example, the columns are equally radially spaced from one other although other arrangements may be used in further configurations. Moreover, each face of the central column 30a is substantially parallel to and faces a corresponding face of a respective adjacent column 30b-g.

Figure 2A:
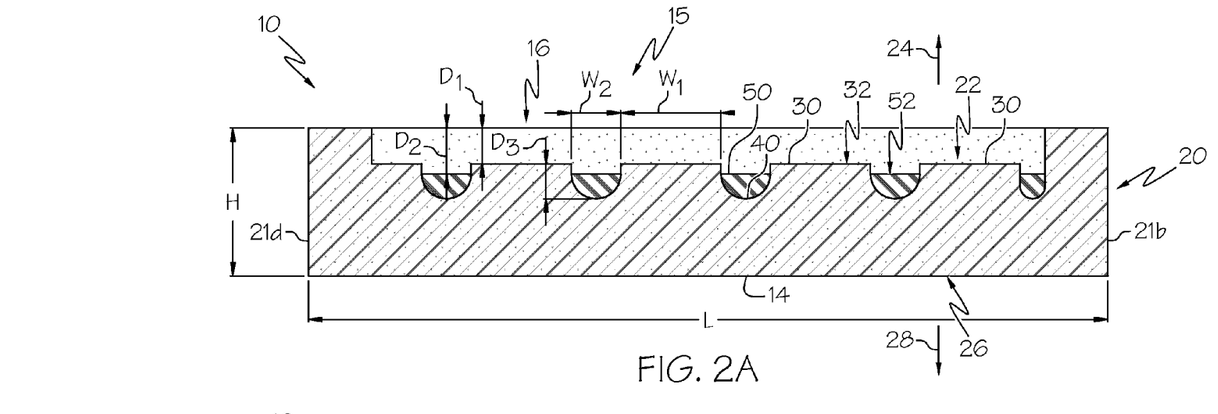
FIG. 2A is a sectional view of the support structure along line 2A-2A of FIG. 2.
Figure 2B:
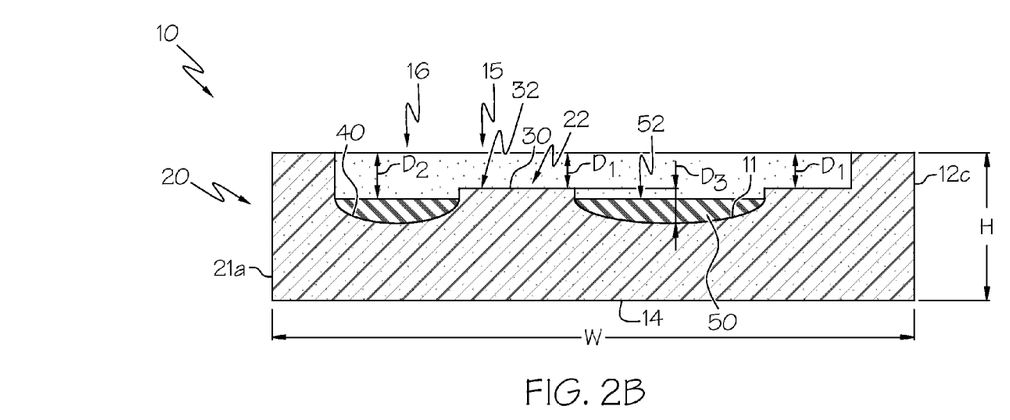
FIG. 2B is a sectional view of the support structure along line 2B-2B of FIG. 2.

As shown in FIGS. 2A and 2B, the first support surface 32 of the columns may be recessed a distance ($D_1$) within an interior area 16 of the support structure 10 although the first support surface 32 of the columns may be the same height as the peripheral wall 21 in further examples. Moreover, as shown, all of the columns are recessed substantially the same distance ($D_1$). In further examples, the first support surface 32 of one or more of the columns may be recessed different distances and may even extend higher than the peripheral wall 21 in further examples. As shown, the first support surface 32 of the columns may be substantially planar in shape although the first support surface of the columns may also be convex, concave or have ribbed portions, wave patterns, or other surface characteristics in further examples.

As shown in FIGS. 2, 2A and 2B, the first layer 20 of foam material can include a peripheral wall 21 having a height (H) extending around the peripheral wall 21. In the illustrated example, the peripheral wall 21 includes four sides 21a, 21b, 21c, 21d although more or less than four sides may be provided in further examples. For instance, the peripheral wall 21 can include a single side with a circular, oval or other shape. Furthermore, although each of the plurality of sides include a substantially linear extent, it is contemplated that at least a portion of the wall can have an arcuate portion.

As further shown in FIGS. 2A and 2B, the example first layer 20 of foam material can further include a bottom wall 14 extending between the side walls 21a, 21b, 21c, 21d. As shown, the bottom wall 14 can have a substantially planar bottom surface although other surface characteristics may be provided in further examples. In the illustrated example, the bottom wall 14 closes the bottom portion of the support structure 10. As further shown, the side walls 21a, 21b, 21c, 21d define an opening 15 into the interior area 16 of the support structure 10.

As shown in FIGS. 2, 2A and 2B, the second layer 50 of elastomeric gel material can be disposed within the plurality of channels 40 and provided with a second support surface 52 facing the first direction 24 and disposed laterally with respect to each first support surface 32. As shown, the second layer 50 of elastomeric gel material can be disposed in the network 42 of channels to define a network of gel material. As shown, the second layer 50 of elastomeric gel material can be arranged such that the second support surface 52 surrounds at least one of the plurality of protrusions 30. As shown in FIG. 2 for example, the second support surface 52 completely surrounds a plurality of inner protrusions. As further illustrated, the second support surface 52 can partially surround peripheral protrusions. It is also contemplated that the second support surface may partially surround at least some or all of the inner protrusions in further examples. Moreover, as shown, the second layer 50 of elastomeric gel material can be provided as a single network of gel material although two or more separate networks or gel portions maybe provided in further examples.

As shown in FIGS. 2A and 2B, the protrusions 30 can be designed to extend at least partially through the second layer 50 of elastomeric gel material with the second support surface 52 disposed laterally with respect to each first support surface 32. For example, as shown in FIG. 2, the second layer 50 of elastomeric gel material can include a plurality of through apertures 54 with the plurality of protrusions 30 each extending at least partially through a corresponding aperture of the plurality of apertures 54. As shown in FIG. 1A, each aperture 54 can include an interior surface 56 bonded to the corresponding protrusion 30 extending at least substantially through the aperture 54.

As shown in FIGS. 2A and 2B, the second layer 50 of elastomeric gel material is filled such that the level of the second layer 50 of elastomeric gel material extends to a recessed distance ($D_2$) within the interior area 16 of the first layer 20 of foam material. As shown, the recessed distance ($D_1$) of the first support surface 32 of the protrusions 30 is less than the recessed distance ($D_2$) of the second support surface 52 of the second layer 50 of elastomeric gel material. As such, the first support surface 32 of the protrusions 30 form a plurality of islands that are separated from one another by the second layer 50 of elastomeric gel material. Moreover, the first support surface 32 of each protrusion 30 is positioned at a respective vertical distance above the second support surface 52 of the second layer 50 of elastomeric gel material.

Figure 5:
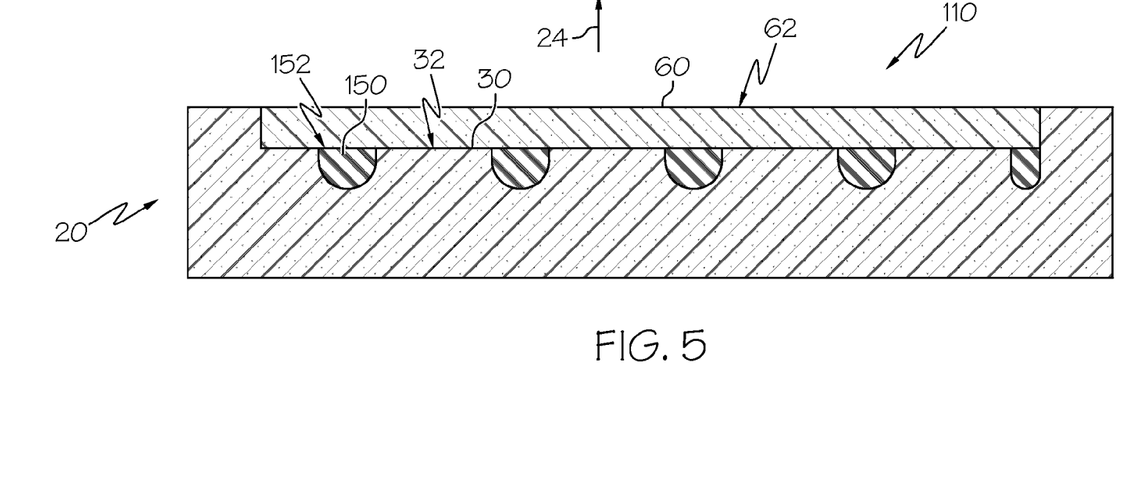
FIG. 5 is a sectional view of a support structure in accordance with another example of the present invention.

In further examples, the recessed distances ($D_1$, $D_2$) may be substantially equal to one another. For example, FIG. 5 is a sectional view of another support structure 110 similar to the support structure 10 of FIG. 1A, except the first support surface 32 of each of the protrusions 30 is substantially flush with respect to the second support surface 152 of the second layer 150.

Figure 6:
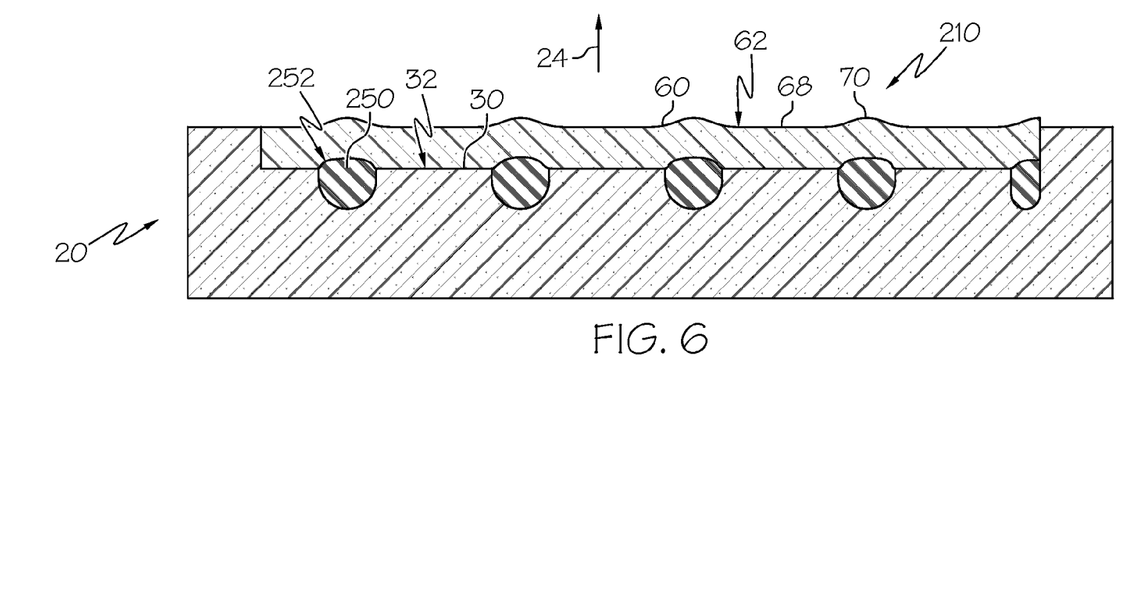
FIG. 6 is a sectional view of a support structure in accordance with still another example of the present invention.

In still further examples, the recessed distance ($D_1$) may be greater than the recessed distance ($D_2$). If the recessed distance ($D_1$) is greater than the recessed distance ($D_2$), the first support surface of one or more of the protrusions may or may not be covered by the second layer of elastomeric material. For example, FIG. 6 is a sectional view of another support structure 210 similar to the support structure 10 of FIG. 1A, except the first support surface 32 of each of the protrusions 30 is positioned at a respective vertical distance below the second support surface 252 of the second layer 250 of elastomeric gel material. Moreover, it is noted that the second layer 250 of elastomeric gel material does not cover the first support surface 32 of the protrusions. Although not shown, the second layer of elastomeric gel material may partially or entirely cover the support surface of one of more of the protrusions.

The support structure of any of the embodiments herein can further include an optional third layer 60 extending over the first support surface of the protrusions and the second support surface of the second layer. For example, with reference to FIGS. 1, 1A and 1B, the support structure 10 includes a third layer 60 extending over the first support surface 32 of the protrusions 30 and the second support surface 52 of the second layer 50 of elastomeric gel material. The third layer 60 includes a support surface 62 that can substantially face in the first direction 24.

As shown in FIGS. 1A and 1B, third layer 60 may be provided to close an opening 15 into the interior area 16 of the first layer 20 of foam material. An adhesive may be used to attach first and third layers 20, 60 together. Alternatively, as shown, the second layer 50 of elastomeric gel material may act as an adhesive to join the first and third layers 20, 60 together. Thus, the second layer 50 of elastomeric gel material may act to bond the third layer 60 to the first layer 20 of foam material.

Use of the elastomeric gel material to join the first and third layers 20, 60 together can result in various topographies along the support surface 62 of the third layer 60. For instance, as shown in FIGS. 1, 1A and 1B, due to the fact that ($D_1$) is less than ($D_2$), the areas of third layer 60 that are attached to the second layer 50 are pulled down such that, when viewed from the top, a plurality of support mounds 64 are surrounded by a plurality of support channels 66. The support mounds 64 are caused by the first support surface 32 of the plurality of protrusions 30 pressing against the third layer 60. The support mounds 64 may therefore be each vertically aligned with a corresponding one of the protrusions 30 of the first layer 20 of foam material. The pulled down areas of the third layer 60 can also define support channels 66 that follow the pattern of the support surface 52 of the second layer 50.

In another example, as shown in FIG. 5, the first support surface 32 of each of the protrusions 30 is substantially flush with respect to the second support surface 152 of the second layer 150. As a result the support surface 62 of the third layer 60 is substantially planar.

Still further, as shown in FIG. 6, the first support surface 32 of each of the protrusions 30 is positioned at a respective vertical distance below the second support surface 252 of the second layer 250 of elastomeric gel material. As a result, areas of third layer 60 that are attached to the second layer 50 are pulled down such that, when viewed from the top, a plurality of support depressions 68 are surrounded by a plurality of support ribs 70. The support depressions 68 can be caused by an adhesive layer applied to the first support surface 32 of the plurality of protrusions 30 to pull against the third layer 60. The second support surface 52 of the second layer 50 can be adhered to portions of the third layer 60 and can push portions of the third layer up and around the support depressions 68 to defined the support ribs 70.

The third layer 60 can comprise a foam material although other nonfoam materials may be used in further examples. For example, the third layer may comprise a thin polyurethane layer or other thin layer of membrane material. Similar or different foam materials may be used to form the first layer 20 and the third layer 60. In the illustrated example, the third layer 60 comprises a foam material that is identical to the foam material of the first layer 20. A wide range of foam materials may be used to fabricate the first layer 20 and the third layer 60. For instance, a flexible foam material may be used in accordance with aspects of the present invention. The illustrated foam material of the first layer 20 and the third layer 60 are provided as open cell foam although other types of foam such as a closed cell foam may be used in accordance with further aspects of the invention. In the illustrated example, the foam material may have a shape memory wherein the foam material is capable of being temporarily deformed under force, but substantially regains its original shape after the force is removed.

The second layer 50 of elastomeric gel material can be formed from a wide range of gels. In one example, the gel material comprises a self-contained gel material. For instance, in one example, the elastomeric gel material comprises a crosslinked gel material capable of retaining its shape and bonding to the first layer 20 of foam material and/or bonding to the third layer 60 of foam material. In another example, the elastomeric gel material can comprise a polyurethane gel material although other gel materials may be used in further examples. The elastomeric gel material can have a shape memory that allows the gel material to be temporarily deformed under force, but substantially regain its original shape after the force is removed. The second layer 50 of elastomeric gel material can have a density that is greater than the density of the first layer 20 and the third layer 60. A wide range of gel materials can be used in accordance with the present invention that have a self-contained characteristic. One example can comprise a polyurethane gel material available from Polymer Concepts, Inc. having a place of business at 7561 Tyler Blvd., Suite 8, Mentor, Ohio 44060. Moreover, the various types of useful elastomeric gel materials can provide the support structure 10 with different support characteristics than the first layer 20 and the second layer 50. For example, known polyurethane gel materials can provide a firm support characteristic while the foam portions provide soft support portions.

One example of making the support structure will now be described. As shown in FIG. 3, a first layer 20 of foam material is provided with a first side including a plurality of protrusions 30 and a plurality of channels 40. Each of the protrusions are provided with a first support surface 32. The first layer 20 can be formed by widely known techniques with the desired shape, such as above-described shape including the peripheral wall 21, the interior area 16, protrusions 30 and channels 40.

The method of making the support structure can further include the step of dispensing a liquid material into the plurality of channels 40 to a liquid level to at least partially fill the channels 40. The elastomeric gel material can be introduced into the channels 40, for example, by pouring and/or injecting the gel material. For instance, with reference to FIG. 4, a schematic depiction of a gel dispenser 80 is shown including a nozzle 82 used to introduce the gel material into the channels 40. The gel material can be introduced into the channels until the form shown in FIG. 2 is achieved. It will be appreciated that different amounts of gel material can be provided to achieve the configurations shown in FIGS. 2A/2B, FIG. 5, FIG. 6 or other configurations. For instance, the method of making can include dispensing elastomeric gel material such that the first support surface 32 of each protrusion 30 is positioned at a respective vertical distance above the liquid level.

The method of making the support structure can further include the step of curing the dispensed liquid into the second layer of elastomeric gel material such that the second support surface is formed at the liquid level. Optionally, the third layer 60 may be positioned over the first support surface 32 of the protrusions 30 and the second support surface 32 of the second layer 50 of elastomeric gel material.

In further examples, the second layer 50 may be preformed separately and then subsequently joined to the first layer 20. For example, a second layer 50 may be formed as a network of elastomeric gel material before introduction to the first layer 20. Then the network of elastomeric gel material may be placed such that each aperture 54 is aligned with a corresponding protrusion 30 of the first layer 20. Each protrusion is then at least partially inserted into the corresponding aperture 54 of the network of elastomeric gel material. The gel material may then adhere to the first layer by the nature of the gel material. Alternatively, or in addition, a layer of adhesive material may be used to join the layers together.

The third layer 60 can be formed as a sheet of material configured to fit within the opening 16 into the interior area 16 of the first layer 20 of foam material. Due to the nature of the elastomeric gel material, the third layer 60 can be adhered to the second layer 50 of elastomeric gel material. Optionally, an adhesive may be used to attach first layer 20 to the third layer 60.

The second layer 50 of elastomeric gel material, the first layer 20 of foam material and the third layer 60 can be configured to provide the desired support characteristics for the particular application. Indeed, the amount of gel material can be provided such that excessive gel material is avoided that would otherwise add too much weight and/or cost to the support structure and/or provide too much firmness to the support structure. At the same time, sufficient gel material can be provided to provide enhanced support characteristics to provide a firmer support than would be available from an all-foam configuration. The first support surface 32 of the plurality of protrusions 30 can also form islands that are separated from one another by the gel material to provide a soft textured feel to the support structure. A wide range of relative dimensions can be used to optimize the overall and/or patterned firmness vs. softness characteristics (i.e., durometer) of the support structure. For example, as shown in FIGS. 2A and 2B, in just one example, the height (H) can be approximately 1½ inches, the distance ($D_1$) can be approximately ⅛ to ¼ of an inch, the distance ($D_2$) can be approximately ¼ to ½ of an inch, the distance ($D_3$) can be approximately ½ to ¾ of an inch, the width ($W_1$) can be approximately 1¼ to 1½ inches, and the width ($W_2$) can be approximately ½ to ¾ of an inch. An appropriate overall length (L) and width (W) may also be selected depending on the particular application. Further dimensions may be provided in further examples in accordance with aspects of the present invention. Accordingly, the dimensions listed above are just one example of dimensions that may be provided.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A support structure comprising:
   a first layer of foam material including a first side with a plurality of protrusions and a plurality of channels, wherein the protrusions each include a first support surface substantially facing a first direction;
   a second layer of elastomeric gel material disposed within the plurality of channels and wherein the elastomeric gel material comprises a crosslinked gel material capable of retaining its shape, and forms a cured bond with the foam material of the plurality of protrusions and the plurality of channels, wherein the second layer includes a second support surface substantially facing the first direction and disposed laterally with respect to each first support surface; and
   a third layer extending over the first support surface of the protrusions and the second support surface of the second layer, wherein the second layer of elastomeric gel bonds the third layer to the first layer and the third layer includes a support surface substantially facing the first direction, wherein portions of the third layer are bonded with the second support surface such that the support surface of the third layer forms a plurality of support areas that are each vertically aligned with a corresponding one of the protrusions of the first layer.

2. The support structure of claim 1, wherein the first support surface of each protrusion is positioned at a respective distance from the second support surface in the first direction, wherein areas of the third layer are bonded with the second support surface such that the support surface of the third layer forms a plurality of mounds that are each vertically aligned with a corresponding one of the protrusions of the first layer.

3. The support structure of claim 1, wherein the first support surface of each protrusion is substantially aligned with the second support surface in the first direction such that the first support surface of each of the protrusions is substantially flush with respect to the second support surface of the second layer of the elastomeric gel.

4. The support structure of claim 3, wherein the support surface of the third layer is substantially planar.

5. The support structure of claim 1, wherein the second support surface of the second layer of the elastomeric gel is positioned at a respective distance from the first support surface in the first direction, wherein areas of the third layer are bonded with the second support surface such that the support surface of the third layer forms a plurality of support ribs that are vertically aligned with the second layer of the elastomeric gel.

6. The support structure of claim 5, wherein the support surface of the third layer forms a plurality of support depressions that are vertically aligned with a corresponding one of the protrusions of the first layer.

7. The support structure of claim 1, wherein the second support surface of the second layer of the elastomeric gel is positioned at a respective distance from the first support surface in the first direction, wherein areas of the third layer are bonded with the second support surface such that the support surface of the third layer forms a plurality of support depressions that are vertically aligned with a corresponding one of the protrusions of the first layer.

8. The support structure of claim 1, wherein the third layer comprises a foam material.

9. The support structure of claim 1, wherein the third layer comprises a membrane material.

10. The support structure of claim 9, wherein the membrane material comprises a polyurethane layer.

11. The support structure of claim 1, wherein the second support surface surrounds at least one of the plurality of protrusions.

12. The support structure of claim 1, wherein the plurality of protrusions comprises an array of protrusions.

13. The support structure of claim 1, wherein the plurality of channels comprises a network of channels surrounding at least one of the plurality of protrusions.

14. A support structure comprising:
   a first layer of foam material including a first side with a plurality of protrusions that each include a first support surface substantially facing a first direction;
   a second layer of elastomeric gel material including a second support surface substantially facing the first direction and disposed laterally with respect to each first support surface, the second layer including a plurality of through apertures, wherein the second layer of elastomeric gel material comprises a crosslinked gel material capable of retaining its shape, and forms a cured bond with the foam material of the plurality of protrusions, wherein the plurality of protrusions each extend at least partially through a corresponding aperture of the plurality of apertures; and a third layer extending over the first support surface of the protrusions and the second support surface of the second layer, wherein the second layer of elastomeric gel bonds the third layer to the first layer and the third layer includes a support surface substantially facing the first direction, wherein portions of the third layer are bonded with the second support surface such that the support surface of the third layer forms a plurality of support areas that are each vertically aligned with a corresponding one of the protrusions of the first layer.

15. The support structure of claim 14, wherein the first support surface of each protrusion is positioned at a respective distance from the second support surface in the first direction, wherein areas of the third layer are bonded with the second support surface such that the support surface of the third layer forms a plurality of mounds that are each vertically aligned with a corresponding one of the protrusions of the first layer.

16. The support structure of claim 14, wherein the first support surface of each protrusion is substantially aligned with the second support surface in the first direction such that the first support surface of each of the protrusions is substantially flush with respect to the second support surface of the second layer of the elastomeric gel.

17. The support structure of claim 16, wherein the support surface of the third layer is substantially planar.

18. The support structure of claim 14, wherein the second support surface of the second layer of the elastomeric gel is positioned at a respective distance from the first support surface in the first direction, wherein areas of the third layer are bonded with the second support surface such that the support surface of the third layer forms a plurality of support ribs that are vertically aligned with the second layer of the elastomeric gel.

19. The support structure of claim 18, wherein the support surface of the third layer forms a plurality of support depressions that are vertically aligned with a corresponding one of the protrusions of the first layer.

20. The support structure of claim 14, wherein the second support surface of the second layer of the elastomeric gel is positioned at a respective distance from the first support surface in the first direction, wherein areas of the third layer are bonded with the second support surface such that the support surface of the third layer forms a plurality of support depressions that are vertically aligned with a corresponding one of the protrusions of the first layer.

21. The support structure of claim 14, wherein the third layer comprises a foam material.

22. The support structure of claim 14, wherein the third layer comprises a membrane material.

23. The support structure of claim 22, wherein the membrane material comprises a polyurethane layer.

24. The support structure of claim 14, wherein the second support surface surrounds at least one of the plurality of protrusions.

25. The support structure of claim 14, wherein the plurality of protrusions comprises an array of protrusions.

26. The support structure of claim 14, wherein the plurality of channels comprises a network of channels surrounding at least one of the plurality of protrusions.

* * * * *